UNITED STATES PATENT OFFICE.

FREDERICK MOENCH, OF RUSHVILLE, ILLINOIS.

PROCESS OF PLATING OR DECORATING CHINAWARE OR GLASSWARE.

1,157,569.  Specification of Letters Patent.  Patented Oct. 19, 1915.

No Drawing.  Application filed April 8, 1915.  Serial No. 19,879.

*To all whom it may concern:*

Be it known that I, FREDERICK MOENCH, a citizen of the United States, and a resident of Rushville, in the county of Schuyler and State of Illinois, have invented a new and useful Improvement in Processes of Plating or Decorating Chinaware or Glassware, of which the following is a specification.

My invention relates to improvements in processes for plating or decorating chinaware, glassware, etc., with aluminum, and it consists in the steps hereinafter pointed out.

An object of my invention is to provide a novel process by means of which china, glassware, etc., may be plated with a permanent coating of aluminum, which is easily carried out by the use of materials and chemicals found in the ordinary laboratory.

A further object of my invention is to provide a process of the type described which may be accomplished cheaply and quickly.

A further object of my invention is to provide a process for plating or decorating ceramic ware in which the plating material is firmly secured to the surface of the glass or other material, so that the plated coating may be polished without chipping it from the body to which it is secured.

Other objects and advantages will appear in the following specification, and the novel features of the invention will be particularly pointed out in the appended claims.

In carrying out my invention, I first carefully wash the china or glass in warm water, and then apply to the parts to be plated hot hydrofluoric acid. The vessel or body to which the hydrofluoric acid has been applied is now warmed until the acid dries. The acid is applied a second time in the same manner, and after it has been dried, it is washed off with clear water and wiped dry with a clean cloth. The vessel or other object to be plated is now washed with a solution of bicarbonate of soda and water, say a 10% solution, or as strong a solution as is needed to remove the acid and all traces thereof. The vessel is now rinsed off in clear water to remove the soda, and then dried with a clean cloth. The vessel is now washed with peroxid of hydrogen and then is rinsed in clear water.

In preparing the aluminum I cut the same into small pieces which are first washed with peroxid of hydrogen and then rinsed in clear water and dried. The glass or chinaware vessel is now heated gradually over a convenient burner, and at the same time a small bit of aluminum is heated almost to the melting point. This may be done by holding the aluminum over a fire with a pair of convenient pliers. When the glass or chinaware has reached almost a red heat, the aluminum is applied to the prepared places, rubbing it slightly as it melts on. The aluminum is now scratched into the prepared surface by means of an instrument having an iridioplatinum point. It will be understood, of course, that the aluminum is melted while it is being scratched in. When well covered, the surplus aluminum is scraped off until it is perfectly smooth, and then the vessel is removed from the fire gradually and placed in a suitable retort previously warmed. Here it should be left to cool slowly. After it is cold, it can be removed and polished to suit the operator.

When the process is carried out as described above the china or glassware is coated with a metal coat of aluminum which adheres to the glass firmly.

The process can be carried out at small expense and with materials which are readily available.

I claim:—

1. The herein described process of plating or decorating glass or ceramic ware, which consists in treating the surface to be decorated or plated with hydrofluoric acid, heating the objects to be plated, rubbing on the heated objects melted metal, and allowing the objects with the metal coat to cool.

2. The herein described process of plating or decorating glass or ceramic ware, which consists in treating the surface to be decorated or plated with hydrofluoric acid, heating the objects to be plated, rubbing on the heated objects melted metal, and allowing the objects with the metal coat to cool gradually.

3. The herein described process of plating glass or ceramic ware, which consists in treating the ware to be plated with hydrofluoric acid, heating the ware, rubbing the heated ware with melted aluminum, and subsequently allowing the ware thus treated to cool.

4. The herein described process of plating glass or ceramic ware which consists in treating the ware with hydrofluoric acid, heating the ware to substantially a red heat, applying melted aluminum to the ware thus treated, rubbing the melted aluminum over the surface of the body to be plated, and subsequently cooling the body.

5. The herein described process of plating glass or ceramic ware which consists in treating the ware with hot hydrofluoric acid, heating the ware to substantially a red heat, applying melted aluminum to the ware thus treated, rubbing the melted aluminum over the surface of the body to be plated, and subsequently cooling the body.

6. The herein described process of plating glass or ceramic ware which consists in treating the ware with hot hydrofluoric acid, heating the ware to substantially a red heat, applying melted aluminum to the ware thus treated, rubbing the melted aluminum over the surface of the body to be plated, and subsequently gradually cooling the body.

FREDERICK MOENCH.

Witnesses:
MAX KISTLER,
DON GARRISON.